United States Patent [19]

Neary

[11] 3,724,956
[45] Apr. 3, 1973

[54] DEMOUNTABLE SAMPLE CELL HOLDER AND CELL FOR LIQUID SCINTILLATION COUNTERS

[75] Inventor: Michael P. Neary, Newport Beach, Calif.

[73] Assignee: Beckman Instruments, Inc., Fullerton, Calif.

[22] Filed: Nov. 27, 1970

[21] Appl. No.: 93,253

[52] U.S. Cl..................356/246, 23/254 R, 195/127, 250/71.5 R, 250/106 SC
[51] Int. Cl................................................G01n 1/10
[58] Field of Search.....250/106 SC, 83.6 FT, 83 CD, 250/71.5 R, 71 R, 43.5 R, 43.5 MR; 195/103.5 R, 127; 23/254 R; 356/246

[56] References Cited

UNITED STATES PATENTS

| 3,520,660 | 7/1970 | Webb | 195/103.5 R |
|---|---|---|---|
| 3,437,812 | 4/1969 | Packard | 250/106 SC |
| 3,359,973 | 12/1967 | Hoffman | 195/103.5 R |

Primary Examiner—James W. Lawrence
Assistant Examiner—Davis L. Willis
Attorney—Paul R. Harder and Robert J. Steinmeyer

[57] ABSTRACT

A demountable sample cell holder and cell is provided to adapt liquid scintillation counters for chemiluminescence measurements. The cell holder is cylindrical and mounts in one of the photomultiplier apertures. A sample cell is mounted within the cylinder by pliable spacers and is connected to inlet and outlet fittings on the cell holder by coiled black tubing. The cell is aluminized to enhance photon transfer efficiency and painted black. The holder is formed into two sections which may be unscrewed so that differing size cells may be utilized.

9 Claims, 1 Drawing Figure

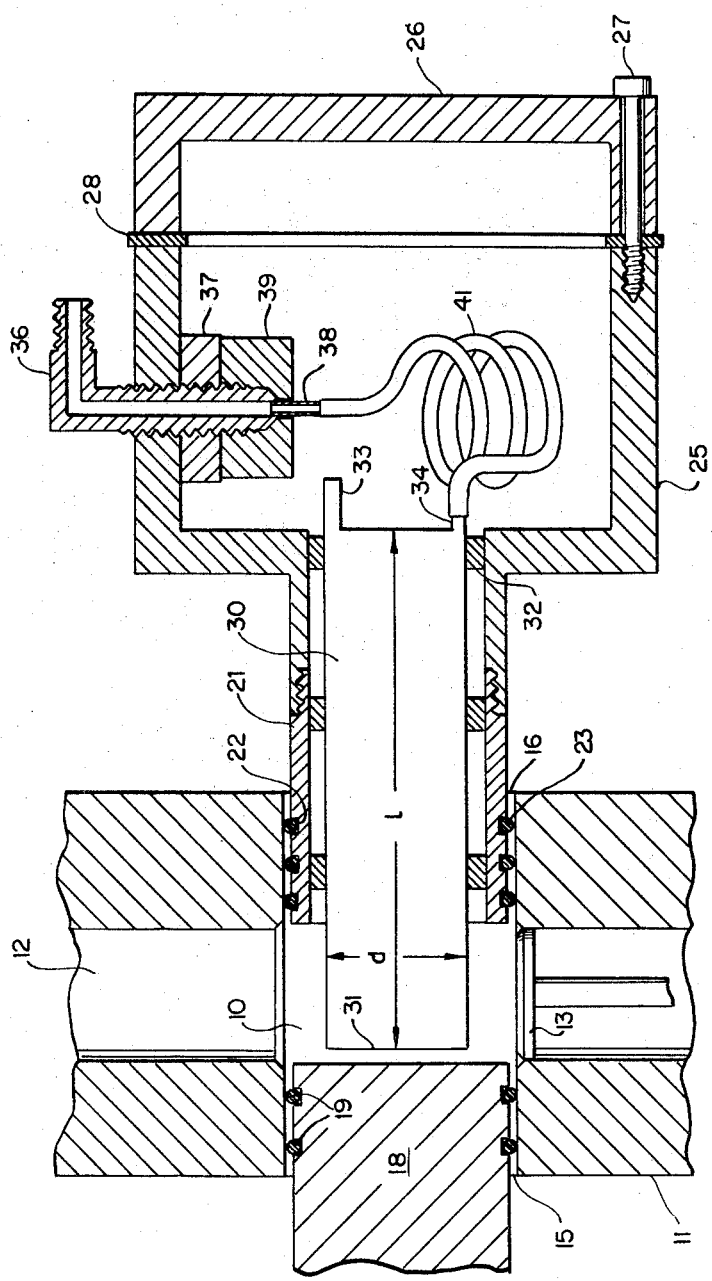

DEMOUNTABLE SAMPLE CELL HOLDER AND CELL FOR LIQUID SCINTILLATION COUNTERS

This invention relates generally to the field of chemiluminescence measurements and more particularly to an in situ sample cell for use in liquid scintillation counters to adapt the counter for chemiluminescent measurements.

Certain chemical reactions result in the production of molecules in an excited electronic state and as these molecules dissipate their energy in returning to the ground state photons or small flashes of light are emitted. Certain other chemical reactions while not chemiluminescent in and of themselves are capable of transferring energy to an emitter or fluorescer which, upon receipt of the energy from the reaction, produces photons. By counting these photons or light flashes, usually as a function of time, various quantitative and qualitative determinations concerning the reaction may be made.

Liquid scintillation counters have been employed to count the photons of light emitted by a scintillator or fluor which is the result of excitation of the scintillator by radioactive particles. Most modern liquid scintillation counters utilize a pair of diametrically opposed photomultiplier tubes facing onto a light tight counting chamber. Although capable of counting the photons emitted from chemiluminescent reactions these modern liquid scintillation counters do not provide a convenient means for such counting since it is the general practice to mix the scintillator with the radioactive material outside the counting chamber, place the sample in a vial and lower the vial into the counting chamber by an elevator through a double light tight sealing mechanism arranged such that the counting chamber at all times is sealed against ambient radiation. This mechanism is not ideally suited to the measurement of chemiluminescent reactions since it is generally desired to register the photon emission data from time zero when the reactants are mixed to completion or for some predetermined period of time. The time taken to lower the mixed reactants from outside the counting chamber through the double light seal and into the counting chamber results in loss of significant photoemission data.

It is the principal object of this invention to provide a sample cell for liquid scintillation counters to adapt these counters to the measurement of chemiluminescent reactions.

Another object of the present invention is to provide a sample cell for liquid scintillation counters which allows in situ mixing of the reactants from which the photons are derived within the counting chamber thus allowing measurement of the photoemission data from time zero.

A further object of this invention is to provide a sample cell holder to adapt modern liquid scintillation counters for chemiluminescent measurements and which is capable of receiving a variety of sample cells such that the sample cell volume and path length may be readily varied to increase the sensitivity measurement. the measurement Other objects and many of the attendant advantages of this invention will become more readily apparent as the same becomes better understood by reference to the following description when read in connection with the accompanying drawing and in which:

The single FIGURE is a partial cross-sectional view of a modern liquid scintillation counter with a chemiluminescent sample cell and holder constructed in accordance with the teachings of this invention in the counting position.

Referring now to the drawing there is illustrated a partial sectional view of the counting chamber 10 which is typically formed within a heavy casting 11 of any suitable material such as brass. Access to the counting chamber is normally through an elevator passageway 12. Also illustrated schematically is the sample vial elevator 13 illustrated in its counting position, it being understood that the elevator passageway has a light sealing shutter at the top and the elevator being arranged such that as the elevator rises, a light seal is made at the junction of the elevator passageway and the counting chamber prior to opening of the outer light sealing shutter so that chamber 10 is at all times sealed against ambient light. Since the elevator is maintained in its counting position at all times while utilizing the invention the elevator and its light sealing mechanism have not been shown in detail and forms no part of the present invention.

In most modern liquid scintillation counters apertures 15 and 16 are formed within casting 11 at diametrically opposed positions for the purpose of receiving and holding photomultiplier tubes, one photomultiplier tube being shown at 18. The photomultiplier tube 18 is retained within the aperture 15 and the chamber sealed against ambient light by a pair of O-rings 19. When utilizing the in situ sample cell of the instant invention one of the photomultiplier tubes is removed and replaced with the sample cell and sample cell holder of the instant invention.

The sample cell holder may be made of any suitable material such as aluminum and comprises the first section 21 in the form of a hollow cylinder having three annular grooves 22 in its periphery which receive O-rings 23. The diameter of cylinder 21 is slightly smaller than the aperture 16 such that the O-rings 21 are compressed and tightly hold the sample cell holder as it is pressed within aperture 16 and to seal the chamber from ambient light. The cylinder is extended and enlarged by the second portion 25 of the sample cell holder which is threaded to the first section 21. This makes the sample holder demountable for the purpose of conveniently changing the sample cell without removing the cell holder from the aperture 16 as will be more fully described hereinafter. The enlarged end of section 25 is closed by a cup-shaped end cap 26, sections 25 and 26 being secured together by a plurality of screws about the periphery one of which is shown at 27. Seal 28 of any suitable opaque material such as neoprene rubber ensures that the interior of the cell holder is sealed against ambient light.

Within the cell holder is a glass vessel or cell 30 having a diameter $d$ and a length $l$. Except for the end 31 facing the photomultiplier tube 18 the entire glass vessel is aluminized on its outer surface to increase photon transfer efficiency and then preferably painted black. End surface 31 is left transparent and, if desired, may be curved to enhance photon collection by the photo cathode of the photomultiplier tube although, in practice, it has been found that such curvature is not necessary.

Cell 30 is held within the housing by a plurality of spacers 32 which may be of any suitable material such as sponge rubber. It has been found convenient to glue these sponge rubber spacers to cell 30 for reasons which will hereinafter become apparent. Inlet and outlet tubes 33 and 34 are formed within the end of the cell 30 opposite the window 31 and are also formed of glass.

Inlet and outlet lines are connected to cell 30, the outlet only being illustrated in the drawing and described herein, it being understood that the inlet line is of identical construction. An elbow fitting of any suitable material, preferably black Teflon, is screwed within the expanded portion of housing 25 and is secured by a lock nut 37. A short glass connecting tube 38 is slipped within the conduit of the fitting and secured by a compression nut 39. Black Teflon tubing 41 connects tube 38 to outlet tube 34, the tubing being long enough and being coiled several times to eliminate light traveling down the conduit from the outer connecting conduit to fitting 37.

In practice it may readily be seen that cell 30 may be filled with the reactants in sequence and the counting started as soon as the second reactant begins to flow into the cell. The reactants are mixed by virtue of the velocity of the incoming fluid and by diffusion. The cell is readily demountable by unscrewing section 25 of the housing from section 21 and sliding the cell from within section 21. Both the diameter d and the length l of the cell may be varied and a plurality of cells provided to suit variable sample requirements in volume and reactant concentration, the differing size cells being supported with spacers having differing apertures therein. For smaller diameter cells apertures in the spacers 32 may be made, if desired, eccentric and the cell rotated until the optimum position of the cell with respect to the photo cathode of the photomultiplier tube found. The diameter of the cell is limited only by the housing diameter and cells of various lengths and diameter may be constructed to satisfy the needs of the individual reactants and volume sized involved. All of the components coming in contact with the reactants are preferably of glass or Teflon to minimize contamination and extraneous reactions and to facilitate cleaning.

There has been illustrated and described a cell holder and cell capable of adapting liquid scintillation counters for chemiluminescent measurements and providing in situ mixing of the reactants. Various cell volumes may be provided and because of the demountable construction of the cell holder, the cells may be replaced without removing the entire cell housing from the photomultiplier tube aperture. Although the cell holder and cell have been described in connection with a preferred embodiment it is obvious that other embodiments and arrangements of parts are possible without departing from the invention as defined by the appended claims.

What is claimed is:

1. A sample cell and holder for adapting a liquid scintillation counter to chemiluminescent measurements, said counter having a light tight counting chamber and a pair of diametrically opposed apertures comprising:
    a sample cell holder having an outer diameter substantially equal to one of said opposing apertures, means on said cell holder for forming a light tight seal with the counting chamber housing when said cell holder is positioned within one of said apertures;
    a sample cell having inlet and outlet means mounted within said holder;
    inlet and outlet conduit means secured within the wall of said holder; and
    flexible tubing means interconnecting said cell inlet means and said inlet and outlet conduit means.

2. A sample cell and holder according to claim 1 wherein said sample cell is formed of glass and having a light transmitting window at one end thereof, the remaining surfaces of said cell being aluminized and coated with black paint.

3. The sample cell and holder according to claim 2 wherein said conduit means is a fitting of black inert material and said flexible tubing is of a black inert material.

4. The sample cell and holder according to claim 3 further comprising at least one pliable spacer interposed between said cell and said cell holder for holding said cell within said holder.

5. The sample cell and holder of claim 4 wherein said spacer is formed of foam rubber.

6. A sample cell and cell holder for use in liquid scintillation counters comprising:
    a first rigid hollow cylinder having a plurality of grooves about its outer periphery adjacent one end thereof;
    a plurality of O-rings in said grooves;
    a second rigid hollow cylinder threaded into the other end of said first rigid cylinder and closed at the opposite end thereof;
    a pair of fittings extending through the outer wall of said second cylinder;
    a sample cell of cylindrical configuration of diameter smaller than the inner diameter of said first hollow cylinder and having inlet and outlet conduit means formed therein;
    at least one pliable spacer supporting said cell within said rigid cylinders; and
    flexible tubing means interconnecting said pair of fittings respectively to one of said inlet and outlet conduit means.

7. The cell holder and cell according to claim 6 wherein said pair of fittings and said flexible tubing is formed of a black inert material.

8. The sample cell holder and cell of claim 7 wherein said flexible tubing means has several loops therein.

9. The sample cell holder and cell according to claim 8 wherein said cell has a transparent window at one end thereof and is aluminized and painted black over its remaining outer surfaces.

* * * * *